(12) United States Patent
Profendiner

(10) Patent No.: US 11,687,149 B2
(45) Date of Patent: Jun. 27, 2023

(54) METHOD FOR OPERATING A MOBILE, PORTABLE OUTPUT APPARATUS IN A MOTOR VEHICLE, CONTEXT PROCESSING DEVICE, MOBILE OUTPUT APPARATUS AND MOTOR VEHICLE

(71) Applicant: AUDI AG, Ingolstadt (DE)

(72) Inventor: Daniel Profendiner, Ingolstadt (DE)

(73) Assignee: AUDI AG, Ingolstadt (DE)

( * ) Notice: Subject to any disclaimer, the term of this patent is extended or adjusted under 35 U.S.C. 154(b) by 0 days.

(21) Appl. No.: 17/268,194

(22) PCT Filed: May 21, 2019

(86) PCT No.: PCT/EP2019/063012
§ 371 (c)(1),
(2) Date: Feb. 12, 2021

(87) PCT Pub. No.: WO2020/035183
PCT Pub. Date: Feb. 20, 2020

(65) Prior Publication Data
US 2021/0318746 A1    Oct. 14, 2021

(30) Foreign Application Priority Data

Aug. 14, 2018   (DE) ..................... 10 2018 213 654.8

(51) Int. Cl.
*G06F 3/01* (2006.01)
*G06V 20/58* (2022.01)
*G06F 16/29* (2019.01)

(52) U.S. Cl.
CPC ............ *G06F 3/011* (2013.01); *G06V 20/584* (2022.01); *G06F 16/29* (2019.01)

(58) Field of Classification Search
None
See application file for complete search history.

(56) References Cited

U.S. PATENT DOCUMENTS

2007/0034212 A1* 2/2007 Brendley ............... A61M 21/00
128/897
2007/0103461 A1* 5/2007 Suzuno ................... G06T 19/00
345/419

(Continued)

FOREIGN PATENT DOCUMENTS

DE            101 56 219 C1      8/2003
DE        10 2015 003 882 A1     9/2016
(Continued)

OTHER PUBLICATIONS

Al-Sultan et al.;"A comprehensive survey on vehicular Ad Hoc network;" Journal of Network and Computer Applications; vol. 37, pp. 380-392; Elsevier, Ltd. (Year: 2013).*

(Continued)

*Primary Examiner* — Edward Martello
(74) *Attorney, Agent, or Firm* — Staas & Halsey LLP

(57) ABSTRACT

A context processing unit receives an environmental signal from a registration unit of a motor vehicle. The environmental signal describes an item of information, independent of a movement direction of the motor vehicle, regarding an event in an environment of the motor vehicle. The event establishes a predetermined thematic context of media content of an output file. The predetermined media content of the output file is changed in dependence on the thematic context of the media content, so that a virtual environment described by the changed media content takes into consideration the information of the event in the environment of the motor vehicle with respect to context. The output file with the changed media content is transmitted to a display unit of an output device which outputs the output file.

6 Claims, 1 Drawing Sheet

(56) References Cited

U.S. PATENT DOCUMENTS

| | | | |
|---|---|---|---|
| 2008/0310707 A1* | 12/2008 | Kansal | G06T 19/006 |
| | | | 382/154 |
| 2009/0119706 A1* | 5/2009 | Hope | H04N 5/76 |
| | | | 725/38 |
| 2015/0100179 A1 | 4/2015 | Alaniz et al. | |
| 2017/0103571 A1 | 4/2017 | Beaurepaire | |
| 2017/0352185 A1* | 12/2017 | Bonilla Acevedo | B60J 1/20 |
| 2018/0027189 A1 | 1/2018 | Feldman et al. | |

FOREIGN PATENT DOCUMENTS

| | | |
|---|---|---|
| DE | 10 2017 005 982 A1 | 2/2018 |
| DE | 10 2018 213 654.8 | 8/2018 |
| WO | PCT/EP2019/063012 | 5/2019 |

OTHER PUBLICATIONS

Guo et al.; "V3: A vehicle-to-vehicle live video streaming architecture;" Pervasive and Mobile Computing 1 (2005), pp. 404-424; Elsevier B.V. (Year: 2005).*

Handmann et al.; "An image processing system for driver assistance;" Image and Vision Computing vol. 8 (2000) pp. 367-376; Elsevier Science B.V (Year: 2000).*

Translation by WIPO dated Mar. 18, 2021 of International Preliminary Report on Patentability for International Application No. PCT/EP2019/063012, 10 pages.

German Office Action dated May 14, 2019 from German Application No. 10 2018 213 654.8, 8 pages.

International Search Report dated Jul. 8, 2019 from International Application No. PCT/EP2019/063012, 4 pages.

* cited by examiner

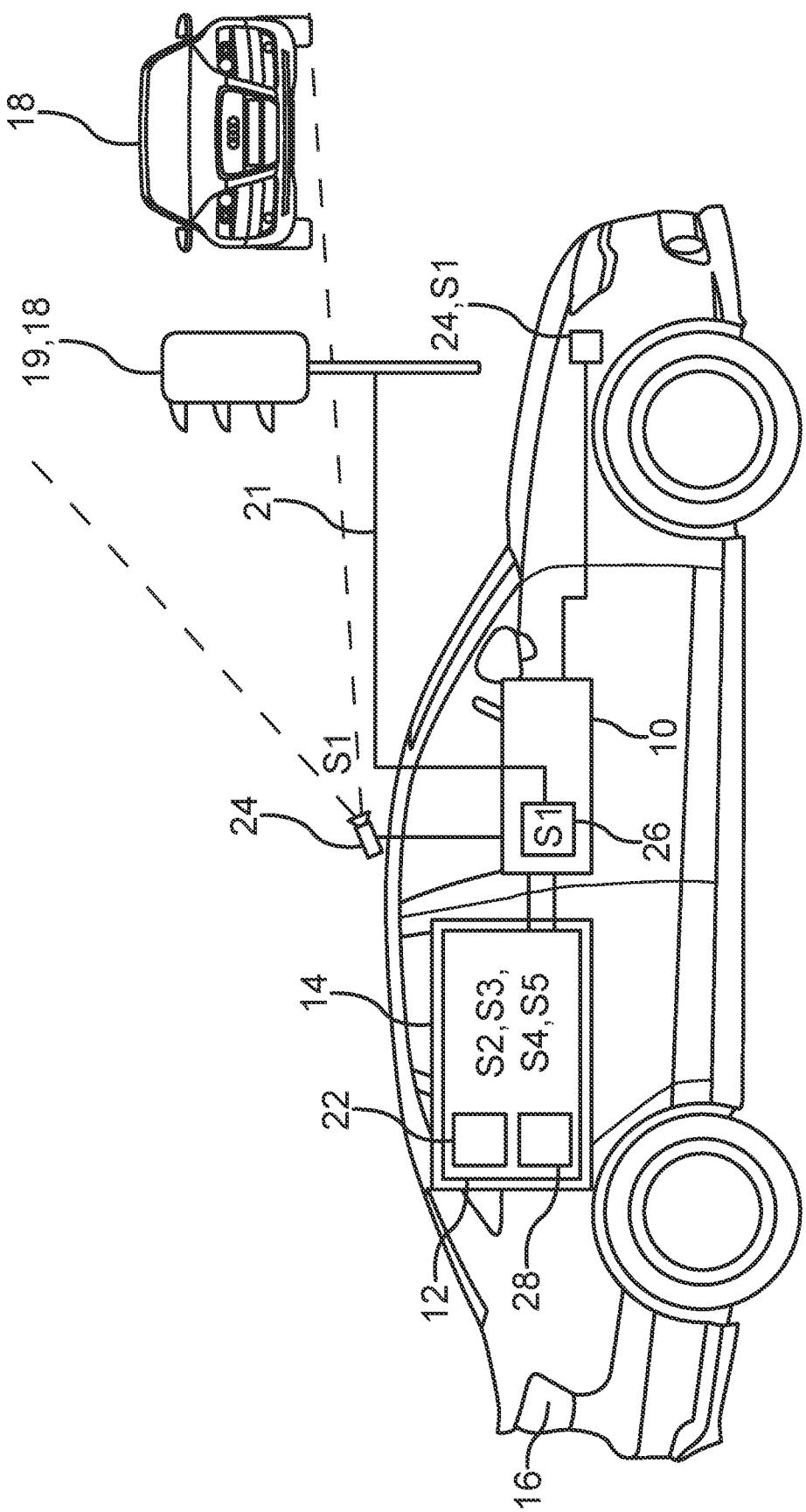

METHOD FOR OPERATING A MOBILE, PORTABLE OUTPUT APPARATUS IN A MOTOR VEHICLE, CONTEXT PROCESSING DEVICE, MOBILE OUTPUT APPARATUS AND MOTOR VEHICLE

CROSS REFERENCE TO RELATED APPLICATIONS

This application is a U.S. national stage of International Application No. PCT/EP2019/063012, filed on May 21, 2019. The International Application claims the priority benefit of German Application No. 10 2018 213 654.8 filed on Aug. 14, 2018. Both the International Application and the German Application are incorporated by reference herein in their entirety.

BACKGROUND

Described below is a method for operating a mobile, wearable output device, for example for operating data glasses which provide a virtual reality ("VR glasses", "AR glasses"). The method specifically relates to operating the output device in a motor vehicle, for example during a journey of the motor vehicle.

Systems are presently being developed for using a virtual reality ("augmented reality") in the vehicle. Such systems use movement data by locating of the motor vehicle in order to represent the movement of a virtual ego object.

The movement of the vehicle thus forms the basis for a motor vehicle-internal system for a virtual reality ("in-car VR system", "in-car AR system"). For example, if a front passenger wears such data glasses in the motor vehicle, the front passenger can play a computer game or view a film, for example, in which the ego object assumes the movements of the motor vehicle. Such a system may be used by a passenger if the motor vehicle is operated in a piloted driving mode.

DE 10 2017 005 982 A1 describes a method for avoiding or reducing kinetosis symptoms when using virtual reality glasses during a journey in a vehicle. During the journey, in addition to a representation of playback contents, an additional movable grid structure is shown on the virtual reality glasses, wherein furthermore a movement of the grid structure takes place in such a way that it corresponds to a current driving-dynamics movement state of the vehicle in accordance with equilibrium.

A method for operating virtual reality glasses arranged in a motor vehicle is known from DE 10 2015 003 882 A1. The method includes, inter alia, registering the movement of the motor vehicle and, in addition to displaying a first virtual environment, simultaneously displaying a second virtual environment in a second display region, which is represented corresponding to the registered movement of the motor vehicle.

DE 101 56 219 C1 describes a method and a device for reducing the kinetosis effect in passengers of public and private transport. Image signals are provided here for the kinetosis-sensitive passenger via optical playback units during the journey, which are modified as a function of journey-specific movement data in such a way that the visual impression of the observed images is correlated with the currently subjectively perceived location and movement values for the passenger.

Methods are thus proposed in the related art in order to reduce a kinetosis effect by also incorporating the vehicle movement.

SUMMARY

An underlying aspect is the provision of a system for providing an even more immersive virtual reality.

The method is based on the concept of overcoming the existing disadvantages in that general, current items of information of an environment of the motor vehicle and/or location-bound items of information of the environment are used and are incorporated into a predetermined thematic context of a media content of an output file which is to be output by the output device. These items of information on an event in an environment of the motor vehicle are independent of a movement direction of the motor vehicle, including an intrinsic movement of the motor vehicle. A coherent, immersive system is thus provided, whereby very many more sensory impressions acting on the user of the output device can be taken in during, for example, a journey in the virtual reality. An extremely high-quality, immersive overall experience is provided in the virtual reality by the use of these items of information.

The method for operating a mobile, wearable output device in a motor vehicle includes the following operations carried out by a context processing unit. A context processing unit is understood as a device or a device component which is configured for evaluating an environmental signal of a registration unit, wherein the environmental signal describes an environment of the motor vehicle registered by the registration unit. The context processing unit can be configured for this purpose, for example, for image analysis and/or for retrieving information on, for example, a geographic position of the motor vehicle, for example via the Internet. Furthermore, the context processing unit is configured to establish a predetermined thematic context of a media content of the output file, for example by an image analysis of the media content, a text analysis, or for reading out a corresponding item of information on the media content. The context processing unit is furthermore configured to change a media content, i.e. to generate an image, an image series, and/or a virtual reality. The context processing unit can use a corresponding algorithm for this purpose, for example.

A registration unit is understood as a device or a device component which is configured and designed for registering the environment and may be, for example, a weather sensor and/or a movement sensor and/or a camera. Alternatively or additionally, the registration unit can be configured to establish a current state of the motor vehicle, and/or to receive information signals from a motor vehicle-external infrastructure, for example a traffic signal.

An environmental signal is received from the registration unit of the motor vehicle by the context processing unit, wherein the received environmental signal describes an item of information independent of a movement direction of the motor vehicle on an event in an environment of the motor vehicle. The received environmental signal thus at least partially describes the event.

The context processing unit establishes a predetermined thematic context of a media content of an output file, wherein the output file is the file which is output or is supposed to be output by the output device. The output file may be a file for generating a virtual reality in this case. The thematic context, for example a virtual computer game or a film, can have the theme "travel through the universe" or "thriller", for example. A context can be understood here as a plot of the media content.

A change of the predetermined media content of the output file follows as a function of the ascertained thematic context of the media content in such a way that the changed media content takes into consideration the information of the event in the environment of the motor vehicle with respect to the context. For example, if the registration unit records another motor vehicle which can cross an intersection from right to left in front of the stationary motor vehicle of the user, for example, the predetermined media content can be changed in such a way that, for example, a spaceship crosses the field of view of the user from right to left. In other words, the predetermined media content of the output file is changed by generating and/or changing an image signal described by the output file, wherein the generated and/or changed image signal describes a virtual event adapted to the registered event of the environment in terms of the context. In other words, the change of the media content can be carried out by generating or changing an image signal, wherein the generated or changed image signal can describe the event of the environment of the motor vehicle as a virtual event in the established thematic context. In other words, the real environment can be incorporated into the media content as an image modified in dependence on the established thematic context; an object and/or a property of the object of the environment can thus be modified and incorporated visually in dependence on the established thematic context.

In other words, a virtual reality is not generated in which the ego object moves like the motor vehicle, but rather the virtual environment, such as objects of the virtual environment, can be adapted to properties, for example movements, in the real environment of the motor vehicle, of real objects of the environment, or added to the virtual reality.

The output file having the changed media content is transferred to a display unit of the output device for output of the output file. A display unit is understood here as the part of the output device which is specifically embodied to display the virtual reality, for example as a display screen.

The above-mentioned advantages result.

According to one embodiment of the method, the information on the event in the environment can be a current item of information describing the environment, such as an item of information on current weather at a current location of the motor vehicle. Thus, for example real noises of raindrops pattering or a real windshield wiper noise can be incorporated immersively into the virtual reality, for example as a virtual ion storm which patters on the ego object or, for example, as a virtual person who wipes away fingerprints on an object.

The item of information on the event of the environment can describe a property of a real object in the environment, such as a property of a vehicle underlying surface and/or an item of information on a traffic signal. Therefore, real objects of the environment of the motor vehicle which act from the outside on the motor vehicle and/or the user and leave behind real sensory impressions with the user, for example rumbling of the motor vehicle during a journey on a cobblestone street or stopping of the motor vehicle at a red traffic signal, can be immersively incorporated, for example in that in the virtual reality a spaceship as the ego object is shaken by a meteorite shower or in that, during a real red phase, in the virtual reality, for example a meteorite shower crossing a flight path of the ego spaceship flies past.

In one refinement, the item of information can describe a movement of the real object, such as a movement direction and/or a velocity at which the real object can move. An experience of the virtual reality becomes even more immersive in this way, i.e., even more authentic.

If the information describes a geographic position of the real object, for example items of location information on, for example, a landscape in which the motor vehicle is located can be incorporated into the virtual reality. The experience would also become much more authentic in this way, an immersion is thus enhanced and improved.

A context processing unit is configured to carry out a method according to one of the above-described embodiments. The context processing unit can be embodied, for example, as a control unit or control circuit board. The context processing unit can include a processor unit, i.e., a part or a device component for electronic data processing. The optional processor unit can include at least one microcontroller and/or at least one microprocessor. A program code can optionally be stored in a data memory, for example a data memory of the context processing unit or the processor unit, which, upon execution by the processor unit, can cause the context processing unit to carry out the above-described embodiments of the method. The above-described advantages result in each case.

The method may be implemented by a motor vehicle, which can be an automobile, for example as a passenger vehicle. The motor vehicle includes an embodiment of the context processing unit. The above-mentioned advantages also result here.

The method may be implemented using a mobile, wearable output device which includes an embodiment of the context processing unit. The term "mobile" is understood here to mean that the output device can be wearable and can be operated without coupling to the motor vehicle. The above-mentioned advantages result. The mobile output device may be an output device wearable on the head, and can particularly be embodied as VR data glasses, alternatively, for example, as a smartphone.

BRIEF DESCRIPTION OF THE DRAWINGS

These and other aspects and advantages will become more apparent and more readily appreciated from the following description of the exemplary embodiments are described hereinafter. For this purpose, the single FIGURE shows a schematic illustration of an embodiment of the method and the devices.

DETAILED DESCRIPTION

In the exemplary embodiments, the described components of the embodiments each represent individual features of the invention to be considered independently of one another, which each also refine the invention independently of one another. Thus, other combinations of the features of the embodiments than those shown are possible. Furthermore, the described embodiments can also be supplemented by further features of the invention already described.

In the FIGURE, identical reference signs each identify functionally-identical elements.

The FIGURE schematically illustrates the principle of the method on the basis of a first exemplary embodiment. In the exemplary embodiment of the FIGURE, a registration unit 10 which is part of the motor vehicle is shown, while a context processing unit 12 can be a component of the output device 14. The output device 14 can be embodied as data glasses for generating a virtual reality, thus as so-called VR glasses. Alternatively, the context processing unit 12 can be a component of the motor vehicle 16. The motor vehicle 16 can be embodied, for example, as a passenger vehicle. The FIGURE shows an optional storage medium 22, a data memory known to a person skilled in the art, which can be, for example, a memory for the context processing unit 12. For example, program code for carrying out the method can be stored on the storage medium 22, and/or one or more output files, which can describe a virtual reality having a media content, for example a computer game or a film.

In the FIGURE, the individual components are connected to one another by data communication connections, which can be embodied either as wireless or as wired data communication connections. An exemplary wireless data communication connection is, for example, a WLAN connection or a Bluetooth connection, and an exemplary wired data communication connection can be, for example, a data bus of the motor vehicle 16 or a cable. In the FIGURE, the data communication connections are shown as black connecting lines.

The registration unit 10 of the motor vehicle 16 may include, for example, one or more sensors, i.e., it can be embodied as a device or device component for registering, for example, a physically, chemically, or optically perceptible property of the environment. An exemplary sensor 24 on a roof of the motor vehicle 16, which can be embodied as a camera, for example, is shown for this purpose in the exemplary motor vehicle 16 of the FIGURE. A further exemplary sensor 24 on, for example, a motor vehicle front of the motor vehicle 16 can be embodied as a weather sensor and/or temperature sensor. Sensors 24 for registering a movement of a real object 18 different from the motor vehicle 16, for example another motor vehicle, or, for example, for registering a signal from a traffic signal 19, which can describe a duration of a red phase, for example, can be embodied as sensors 24 known to a person skilled in the art from the related art.

The registration unit 10 can include, for example, a communication unit 26 for registering a traffic signal, i.e., a part or a device component for receiving signals, optionally also for transmitting signals. The communication unit 26 can receive a signal, which can describe the red phase, from the traffic signal 19, alternatively, for example, from a motor vehicle-external server unit (not shown in the FIGURE) or a satellite via, for example, a radio connection 21. Alternatively or additionally, the communication unit 26 can be embodied, for example, for receiving locating signals and can then be referred to as a navigation element. Such locating signals can be, for example, GPS signals or GLONASS signals that describe the coordinates of a current location of the motor vehicle 16.

To record an associated item of environmental information on the current location, for example, a corresponding item of information can be requested via an Internet or mobile wireless connection to a motor vehicle-external data server (not shown in the FIGURE), for example an item of information on whether the motor vehicle 16 is presently in an urban region or in a special landscape.

The context processing unit 12 can be embodied, for example, as a circuit or control circuit board and can optionally include a processor unit 28.

If the registration unit 10 is optionally additionally configured to establish a movement velocity of the real object 18 of the environment, this can be carried out, for example, by the optional navigation element.

In the example of the FIGURE, a user of the motor vehicle 16, for example a front passenger or, if the motor vehicle 16 is driving in a piloted, i.e., fully autonomous driving mode, an arbitrary passenger can be wearing the output device 14. In S1, the optional provision of the information on an event in the environment is shown. The event can be the exemplary red phase of the traffic signal 19, or, for example, the other motor vehicle, which can cross a path of the motor vehicle 16 of the user of the output device 14. Additionally or alternatively, current rainy weather can be registered (S1) as the event, for example.

The exemplary camera can transmit, for example, a camera image from the motor vehicle to the registration unit 10. Alternatively thereto, the registration unit 10 can receive a radio signal of the other motor vehicle, for example via a motor vehicle to motor vehicle communication, which can describe, for example, a movement direction and a movement velocity of the other motor vehicle. These items of information can be transmitted as an environmental signal—or in separate environmental signals—to the context processing unit 12. Similarly thereto, a corresponding environmental signal can describe the rainy weather. A further, optional environmental signal can be an item of information ascertained on the basis of an item of location information, for example, wherein the environmental signal can describe a cobblestone as an underlying surface of the motor vehicle 16.

The context processing unit 12 can be configured, for example, for image analysis and/or image processing. On the basis of the environmental signal, which can describe the camera image, the context processing unit 12 can recognize, for example, the contours of the other motor vehicle.

The exemplary output file can be, for example, a computer game in a science fiction world. For example, the context processing unit 12 can query and thus establish (S2) the thematic context of the output file by a databank query at a motor vehicle-external data server or by way of, for example, a corresponding item of information of the output file, which can be provided by a producer of the output file.

The output file can, for example, specify a predetermined plot as the media content. The context processing unit 12 can establish (S3), for example, that in a current sequence of the computer game, an ego object flies in its perspective through the universe. The event of the current red phase having, for example, a duration of three minutes can then be taken into consideration, for example, in that the context processing unit 12 changes an image signal described by the output file—or generates a new image signal—to change the predetermined media content (S4) in such a way that can describe an interruption in a flight movement of a virtual environment of the media content for three minutes. Additionally or alternatively, the other motor vehicle can be taken into consideration in that, for example, the generated or changed image signal in the changed media content can describe a virtual object which can, for example, cross the field of view of the user from left to right on a display screen of the output device 14, e.g., at a velocity of the real object 18, or at a velocity which can occupy the virtual object passing by from left to right on the display screen for a duration of three minutes.

The optional information on current rainy weather can be taken into consideration (S4), for example in the change of the predetermined media content, in that the virtual image described by the output file can describe a meteorite shower or ion storm. An exemplary item of information about a real cobblestone can be taken into consideration, for example, in that the changed media content can describe an image in which the virtual environment of the output file can describe a meteorite shower around the ego object during the journey of the real motor vehicle 16. In combination with the real perceived rumbling of the motor vehicle 16, a particularly intensive immersive experience thus results for the user.

To output the output file and at the same time to display the changed media content, the changed output file is transferred (S5) to a display unit (not shown in the FIGURE) from the output device 14, for example to a display screen.

If the media content is a computer animation or image series, the media content can thus be changed (S4) using technologies known from the related art to a person skilled in the art.

Alternatively, for example preprogrammed sequences can be stored in the storage medium 22, which can be retrieved for specific situations and incorporated into the media content, for example. Thus, for example, such a scripted, i.e. predetermined sequence can be used if, for example, an item of information can be provided from the navigation element that the user is presently driving with the motor vehicle 16 from Munich to Regensburg. It can be derived from the information that the journey can last, for example, 1.5 hours. A slot can be incorporated in the output file, for example at one or more points, for example having a duration of 10 seconds, in order to let the exemplary spaceship fly past from left to right similarly to the other motor vehicle. The output file may include a digital list, for example, in which for a duration of 10 seconds, for example, or of three minutes, for example, it can be predetermined which predetermined sequences can be incorporated into the media content.

Overall, the examples illustrate how the use of items of vehicle environmental information can be utilized for an in-car VR. For this purpose, further environmental data of the motor vehicle 16 are also included.

According to a further exemplary embodiment, for example the following items of information can be used:

Items of online traffic signal information, for example an item of information about how long an associated traffic signal 19 can still be red and/or green for the user/the motor vehicle 16; this information can be used in the virtual reality in order, for example, to give context to standing and/or waiting phases of a virtual ego object of the media content. For this purpose, for example scripted sequences and/or events can be generated, which can be synchronized, for example both with respect to the location, for example a location of the traffic signal 19, and also a time, for example a length of the red phase as the duration of the event. In the exemplary context of a space game, for example a large spaceship flying past can be displayed, which can last exactly a length of a red phase; and/or items of local weather information, for example weather impressions (for example rain, thunder) can still be perceived by the user of the output device 14, although the user is located in a virtual world. The reason for this is that the noises are still perceived. For example, by data from a rain sensor system and/or items of online weather information, the information can be included and processed in the virtual reality. For example, rain in reality can be included as an ion storm in a virtual space world, or rain in reality can be included, for example, as flying through a particle cloud in the virtual reality; and/or usage of data about, for example, a vehicle underlying surface; a further item of information which can be perceived by the user of the virtual reality is a current roadway underlying surface (for example cobblestone, forest path, gravel, normal asphalt, speed thresholds, so-called "speed bumps", potholes). These various underlying surfaces cause different haptic driving experiences and can be represented in the virtual reality. For example, a real pothole can be incorporated as an impact of a rocket in the virtual environment. Cobblestones of the real environment of the motor vehicle 16 can be included, for example, in the virtual environment as a field having shaking, for example a flight through a leaf canopy of trees.

In one exemplary technical implementation, the system and/or the method can be implemented as follows:

Streaming of associated vehicle data (for example rain sensor, items of traffic signal information, pothole detection) at an output device 14 embodied as VR glasses, for example; and/or in the case of mobile VR glasses, for example, via utilized vehicle interface, for example Bluetooth and/or Wi-Fi; and/or it is possible to differentiate between, for example, general current items of information (for example items of rain information, items of brightness information), which can be transmitted spontaneously; and/or location-bound items of information (for example items of traffic signal information, vehicle underlying surface, potholes), which can be transmitted together with an item of location information (latitude, longitude, altitude); and/or some of the data (for example items of information about potholes) can be ascertained by swarm data, therefore an interface to a backend via the mobile wireless network can also be used.

A description has been provided with particular reference to preferred embodiments thereof and examples, but it will be understood that variations and modifications can be effected within the spirit and scope of the claims which may include the phrase "at least one of A, B and C" as an alternative expression that means one or more of A, B and C may be used, contrary to the holding in *Superguide* v. *DIRECTV*, 358 F3d 870, 69 USPQ2d 1865 (Fed. Cir. 2004).

The invention claimed is:

1. A method for operating a mobile, wearable output device in a motor vehicle, comprising:

receiving, by a context processor, an environmental signal from a registration unit of the motor vehicle, the environmental signal describing information independent of a movement direction of the motor vehicle regarding an event in an environment of the motor vehicle, the event being one of a noise of at least one of the environment and the motor vehicle, and at least one of a haptically and tactilely perceptible event of motor vehicle movement;

establishing, by the context processor, an action in predetermined thematic context of predetermined media content in an output file;

changing, in dependence on the predetermined thematic context, the predetermined media content of the output file so that a virtual environment described by changed media content contextually takes into consideration the information of the event of the environment of the motor vehicle; and transferring, by the context processor, the output file with the changed media content to a display unit of the wearable output device for outputting the output file.

2. The method according to claim 1, wherein the information on the event of the environment is an item of information on current weather at a current location of the motor vehicle that is taken into consideration by the changing as rain pattering integrated into the action of the predetermined media content.

3. The method according to claim 1, wherein the information on the event of the environment is a property of a vehicle underlying surface that is taken into consideration by the changing as rumbling of the motor vehicle.

4. A context processing unit for a display unit of a wearable output device in a motor vehicle, comprising:
  an interface configured to receive an environmental signal describing an item of information independent of a movement direction of the motor vehicle regarding an event in an environment of the motor vehicle, the event being one of a noise of at least one of the environment and the motor vehicle, and at least one of a haptically and tactilely perceptible event of motor vehicle movement; and
  a processor configured to
    establish a predetermined thematic context of predetermined media content in an output file having a defined space for unspecified content to be added,
    change, in dependence on the predetermined thematic context, the predetermined media content of the output file so that a virtual environment described by changed media content contextually takes into consideration the information of the event of the environment of the motor vehicle; and
    transfer the output file with the changed media content to the display unit of the wearable output device for outputting the output file.

5. A motor vehicle having an occupant using a wearable output device having a display unit, comprising:
  an interface configured to receive an environmental signal describing an item of information independent of a movement direction of the motor vehicle regarding an event in an environment of the motor vehicle, the event being one of a noise of at least one of the environment and the motor vehicle, and at least one of a haptically and tactilely perceptible event of motor vehicle movement; and
  a context processor configured to
    establish a predetermined thematic context of predetermined media content in an output file having a defined space for unspecified content to be added,
    change, in dependence on the predetermined thematic context, the predetermined media content of the output file so that a virtual environment described by changed media content contextually takes into consideration the information of the event of the environment of the motor vehicle; and
    transfer the output file with the changed media content to the display unit of the wearable output device for outputting the output file.

6. A mobile, wearable output device used in a motor vehicle, comprising:
  an interface configured to receive an environmental signal describing an item of information independent of a movement direction of the motor vehicle regarding an event in an environment of the motor vehicle, the event being one of a noise of at least one of the environment and the motor vehicle, and at least one of a haptically and tactilely perceptible event of motor vehicle movement; and
  a context processor configured to
  establish a predetermined thematic context of predetermined media content in an output file having a defined space for unspecified content to be added,
  change, in dependence on the predetermined thematic context, the predetermined media content of the output file so that a virtual environment described by changed media content contextually takes into consideration the information of the event of the environment of the motor vehicle; and
  transfer the output file with the changed media content to the display unit of the wearable output device for outputting the output file.

* * * * *